S. G. BETZ.
TOOL HOLDER.
APPLICATION FILED DEC. 6, 1920.
1,387,343.
Patented Aug. 9, 1921.
2 SHEETS—SHEET 1.
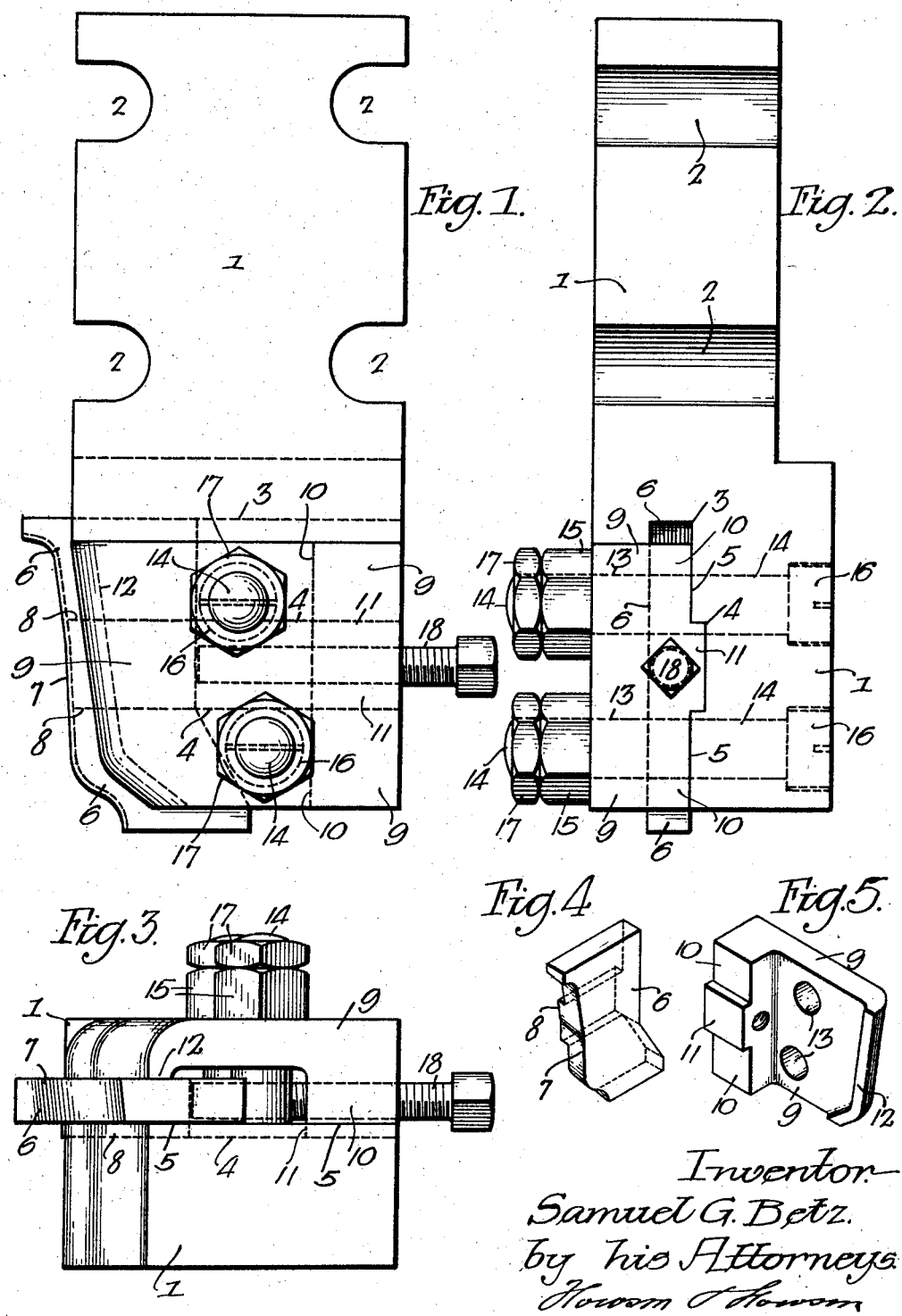
Inventor
Samuel G. Betz.
by his Attorneys S. G. BETZ.
TOOL HOLDER.
APPLICATION FILED DEC. 6, 1920.
1,387,343.
Patented Aug. 9, 1921.
2 SHEETS—SHEET 2.
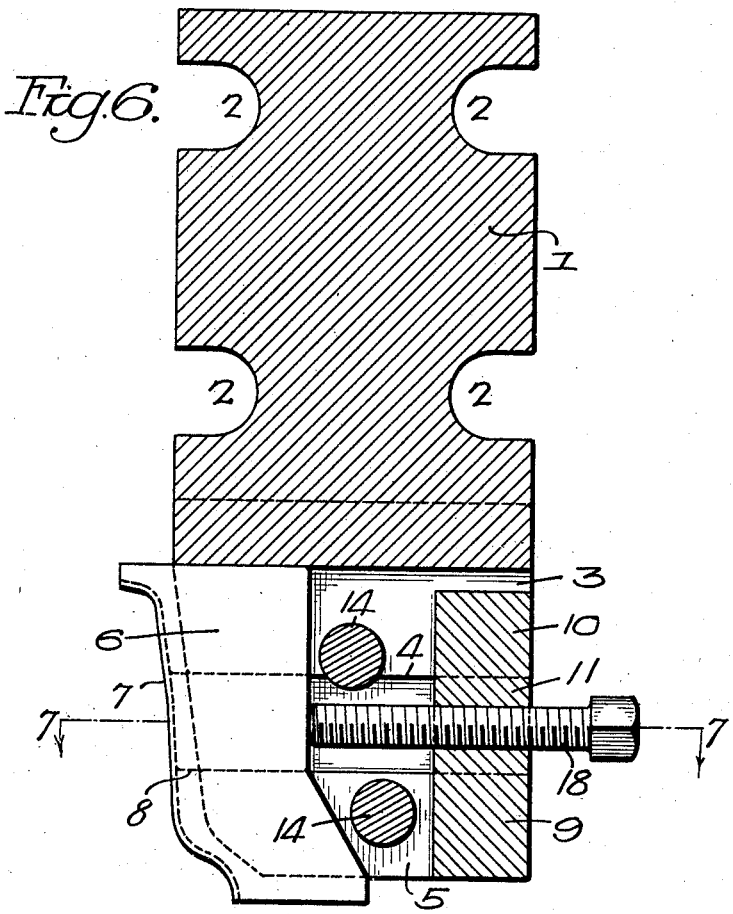
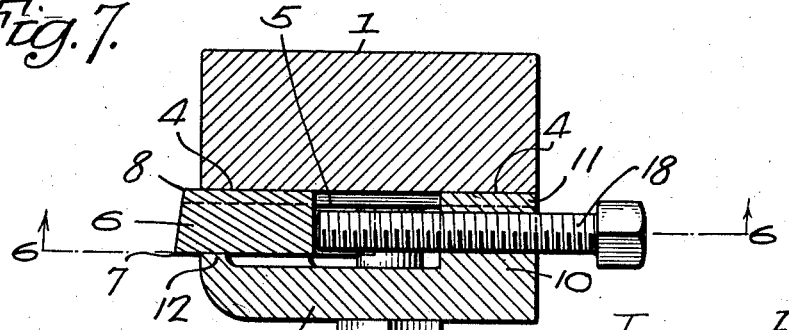
Inventor-
Samuel G. Betz
by his Attorneys

UNITED STATES PATENT OFFICE.

SAMUEL G. BETZ, OF LEWISTOWN, PENNSYLVANIA, ASSIGNOR TO STANDARD STEEL WORKS COMPANY, OF PHILADELPHIA, PENNSYLVANIA, A CORPORATION OF PENNSYLVANIA.

TOOL-HOLDER.

1,387,343.

Specification of Letters Patent.  Patented Aug. 9, 1921.

Application filed December 6, 1920. Serial No. 428,522.

*To all whom it may concern:*

Be it known that I, SAMUEL G. BETZ, a citizen of the United States, residing in Lewistown, Mifflin county, Pennsylvania, have invented certain Improvements in Tool-Holders, of which the following is a specification.

My invention relates to certain improvements in holders for tools for cutting profile work, such as wheels and tires.

One object of my invention is to provide a head which will firmly hold a side cutting tool.

A further object of the invention is to provide a tool which can be readily located in a tool holder.

In the accompanying drawings:

Figure 1, is a side view of a tool holder embodying my invention;

Fig. 2, is a rear end view;

Fig. 3, is an inverted plan view;

Fig. 4, is a detached perspective view of a tool of a given contour;

Fig. 5, is a detached perspective view of the clamp plate;

Fig. 6 is a vertical sectional view on the line 6—6, Fig. 7, and

Fig. 7 is a sectional plan view on the line 7—7, Fig. 6.

In the present instance, the tool is of a contour for machining locomotive tires and car wheels, and as the profile is quite extensive, a very substantial tool and tool holder is necessary. 1 is the body of the tool holder made of forged steel, and is notched at 2 for clamping bolts. The tool holder is recessed at 3, and has a true face 5. In the face 5 is a transverse groove 4.

6 is the tool made as shown in Fig. 4, having a cutting face 7, in the present instance of the contour shown clearly in said figure, and 8 is a rib at the back of the tool which fits in the groove 4 of the holder. This rib and groove keep the tool in proper alinement with the holder.

9 is a clamp clearly shown in Fig. 5, having a lateral extension 10 of the thickness of the tool, and this extension rests against the face 5 of the body portion at the rear of the tool, and has a rib 11 which fits the groove 4. A rib 12 at the forward end bears against the tool near the cutting edge. In the clamp are holes 13 for the passage of the securing bolts 14 which pass entirely through holes in the holder as well as the holes 13 in the clamp, and nuts 15 secure the clamp firmly to the holder.

In the present instance each bolt 14 has a slotted head 16 at the rear and adapted to a socket in the holder so that they will be flush with the surface of the holder, and 17, 17, are jam nuts for locking the nuts 15 after adjustment. It will be noticed that the tool 6 does not extend to the bolts 14, so that it is not necessary to perforate or slot the tool for the bolts.

18 is an adjusting screw projecting through the extension 10 of the clamp and which bears against the rear end of the cutting tool, so that on relieving the clamp and turning the adjusting screw the cutter can be projected, and by reversing the direction of the adjusting screw the cutter can be pushed back into the holder.

By the above construction, it will be seen that I make a very simple and very substantial tool holder which will firmly retain tools and which is especially adapted for holding profiling tools used in cutting heavy work.

I claim:

1. The combination of a holder having a grooved face; a tool adapted to rest against said face and having a rib which enters the groove; a clamp bearing against the holder back of the tool and against the tool near its cutting edge; and means for securing the clamp and tool to the holder.

2. The combination of a recessed tool holder having a bearing face in the recess; a groove in said face; a cutting tool having a rib adapted to the groove and projecting beyond the holder; a clamp having a lateral extension at the rear and bearing against the holder and having a rib in the forward end bearing against the tool near its cutting edge, said clamp also having a rib adapted to the groove in the cutting face; and bolts for securing the clamp and tool firmly to the holder.

3. The combination of a tool holder having a recess, and a bearing face within the recess; a transverse groove in said face; a cutting tool having a cutting edge at one end and a rib at the side adapted to the groove in the face of the holder; a clamp having a lateral extension at the back bearing against the cutting face and having a rib extending into the groove of the holder and having at the forward end a rib bearing against the side of the cutters; two transverse bolts passing through the holder and the clamps, and nuts on the bolts, the bolts extending back of the cutter; and an adjusting screw on the clamp bearing against the rear end of the cutter for the purpose of adjusting the cutter in the holder.

SAMUEL G. BETZ.